Aug. 2, 1927.
E. R. CLEGG
1,637,763
ROLLER SHADE BRACKET
Filed June 10, 1925
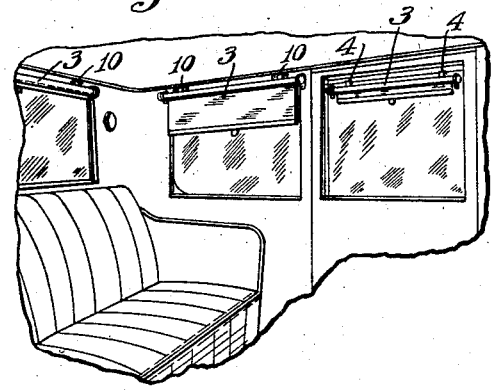
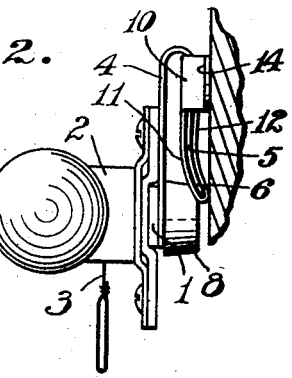
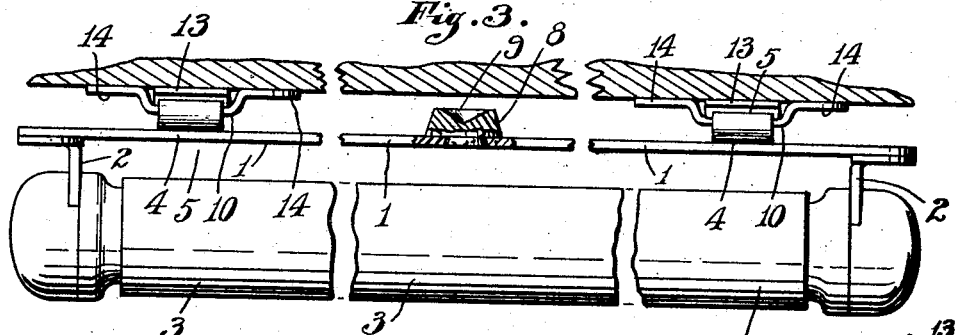
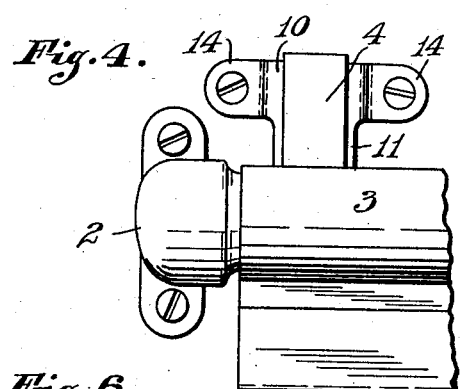
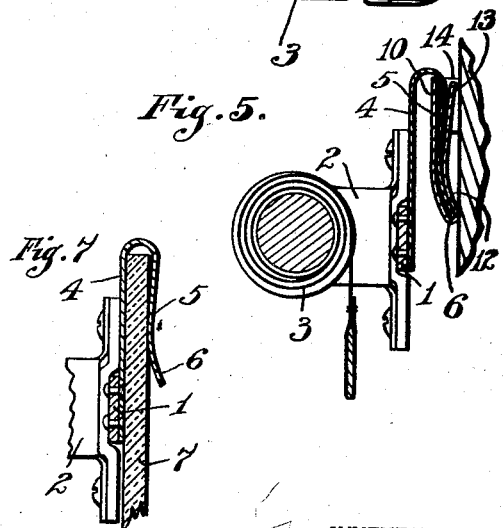
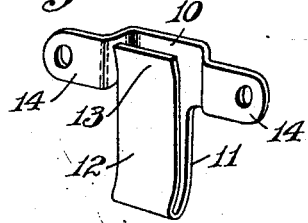
INVENTOR.
Edwin R. Clegg,
BY
Hood & Hahn.
ATTORNEYS Patented Aug. 2, 1927.

1,637,763

UNITED STATES PATENT OFFICE.

EDWIN R. CLEGG, OF LA FAYETTE, INDIANA.

ROLLER-SHADE BRACKET.

Application filed June 10, 1925. Serial No. 36,133.

My invention relates to improvements in shade brackets for automobiles. One of the objects of my invention is to provide a shade bracket comprising a unitary structure and on which the spring operated shade roller may be mounted, the entire structure being so constructed that it may be removably supported to shade different windows of an automobile.

Another object of my invention is to provide a shade bracket for supporting a shade, which bracket may be secured to the adjustable window of the side doors of an automobile and which will be adjusted with the door so that the shade may be maintained in position in front of the glass irrespective of the position to which the glass may be adjusted.

For the purpose of disclosing my invention I have illustrated certain embodiments thereof in the accompanying drawings in which Fig. 1 is an interior view of a closed automobile body showing my improved bracket supporting a shade in various positions;

Fig. 2 is an end view showing the bracket when used in supporting a shade over stationary windows;

Fig. 3 is a plan view showing the shade supported over a fixed window;

Fig. 4 is a front elevation of one end;

Fig. 5 is a transverse section;

Fig. 6 is a perspective of the bracket receiving clip, and

Fig. 7 is a sectional view showing the manner in which the support is secured to an adjustable glass window of an automobile.

In the embodiment illustrated I provide a supporting rod or bar 1 which is flat in cross section and has secured at each end shade fixtures 2 adapted to receive and support the usual spring operated roller shade 3. On the rear face of the bar 1 I secure clips which comprise substantially vertically extending shanks 4 riveted or otherwise secured to the rear face of the bar and these shanks are turned back upon themselves to form spring tongues 5 curved at their lower end slightly outward as at 6. The structure thus comprises a spring hook clip which, as illustrated in Fig. 7, will readily fit over the top edge of a glass window 7 of an automobile. The hooks in cross section are of such width that when the glass window 7 of the automobile door is raised to closed position they will readily project into the top slot of the door with the glass and thereby will not interfere with the closing of the window. Furthermore, due to the fact that these clips project beyond the top of the supporting bar, so that the supporting bar is supported below the top edge of the window, the bar itself and curtain supported thereby will not interfere with the closing of the window.

On the bracket bar 1, intermediate of its ends, I provide on its rear face, a rubber suction cup 8 which, when the bracket is used on the window of an automobile door, will seat on the glass and by a slight pressure the air may be exhausted from the hollow face 9 of the cup so that the cup will clamp on the face of the glass and be held there under the influence of a vacuum or partial vacuum created in the cup. This arrangement prevents rattling of the fixture and aids in maintaining the same rigidly in position.

When the bracket is adapted to be supported over a non-adjustable window I provide clip sockets for the hooks such as are shown in Fig. 6 and comprising a clip portion 10 which is extended into a spring projection 11 turned back upon itself to form a spring back 12, the upper end of which is turned away as at 13 from the clip portion 10 and the structure thus forming a socket for the reception of the tongue 5 of one of the hooks on the bracket 1. The clip portion 10 is provided with transversely extending ears 14 which are in a plane somewhat beyond the back piece 12. A pair of these sockets is secured in position over each of the stationary windows in the car to receive the hooks of a curtain bracket.

I claim as my invention:

1. A curtain support for automobiles comprising a spring bar having on one face thereof bracket fixtures for a shade roller and on the opposite face thereof a pair of downwardly presented clips, said spring bar intermediate the clips having a portion projecting from the clip surface to an extent greater than the distance from said surface to the nearest plane of the clipping mouth, whereby, when the bar is clipped upon a support the bar will be sprung laterally by the projection and the projection will frictionally engage the support.

2. A spring curtain for automobiles comprising a supporting spring bar having on the face thereof bracket fixtures for a shade roller and a pair of downwardly presented spring clips on the opposite face thereof, said clips projecting upwardly beyond the top edge of the bar and a suction cup mounted on the rear face of the bar intermediate of the clips.

3. A curtain support for automobiles comprising a supporting spring bar, a pair of spring roller curtain fixtures mounted on the front face thereof, a pair of downwardly presented clips mounted on the rear face thereof and formed of comparatively thin metal to permit the jaws thereof to open, said clips projecting above the top edge of the bar and a suction cup secured on the rear face of the bar intermediate of the clips.

In witness whereof, I EDWIN R. CLEGG have hereunto set my hand at La Fayette, Indiana, this 3rd day of June, A. D., one thousand nine hundred and twenty-five.

EDWIN R. CLEGG.